US012761852B2

(12) United States Patent
Filali Ansary et al.

(10) Patent No.: US 12,761,852 B2
(45) Date of Patent: Oct. 13, 2026

(54) METHOD FOR OPERATING AN ELECTRONIC DISPLAY-SYSTEM FOR DISPLAYING PRODUCT AND/OR PRICE INFORMATION

(71) Applicant: VusionGroup SA, Nanterre (FR)

(72) Inventors: Tarik Filali Ansary, Nanterre (FR); Francois Xavier Gendrin, Nanterre (FR); Mickel Rougemont, Nanterre (FR); Eric Lanoiselee, Nanterre (FR)

(73) Assignee: VusionGroup SA, Nanterre (FR)

( * ) Notice: Subject to any disclaimer, the term of this patent is extended or adjusted under 35 U.S.C. 154(b) by 0 days.

(21) Appl. No.: 18/849,992

(22) PCT Filed: Apr. 23, 2022

(86) PCT No.: PCT/EP2022/060788
§ 371 (c)(1),
(2) Date: Sep. 23, 2024

(87) PCT Pub. No.: WO2023/202785
PCT Pub. Date: Oct. 26, 2023

(65) Prior Publication Data

US 2025/0208815 A1 Jun. 26, 2025

(51) Int. Cl.
*G06Q 30/00* (2023.01)
*G06F 3/14* (2006.01)

(52) U.S. Cl.
CPC .................................. *G06F 3/1423* (2013.01)

(58) Field of Classification Search
CPC ................................................ G06Q 30/06–08
See application file for complete search history.

(56) References Cited

U.S. PATENT DOCUMENTS

| | | | |
|---|---|---|---|
| 6,043,751 | A | 3/2000 | Goodwin, III |
| 8,869,299 | B2 | 10/2014 | Charbonneau et al. |
| 10,747,810 | B2 | 8/2020 | Vyas et al. |
| 11,074,608 | B2 | 7/2021 | Buchalter et al. |
| 11,295,163 | B1 | 4/2022 | Schoner et al. |

(Continued)

FOREIGN PATENT DOCUMENTS

EP 3982275 A1 4/2022

OTHER PUBLICATIONS

Zhao, Jiawei et al., “A Review of Computer Vision Methods in Network Security”, IEEE Communications Surveys & Tutorials, vol. 23, No. 3, third quarter 2021, pp. 1838-1878 (Year: 2021).*

(Continued)

*Primary Examiner* — Ethan D Civan
(74) *Attorney, Agent, or Firm* — Studebaker Brackett PLLC

(57) ABSTRACT

Method of operating an electronic display-system, wherein the display-system comprises:
- a plurality of electronic display-devices for displaying product and/or price information, wherein each product and/or price information is represented by a content-data-set,
- a data provision system that is designed to provide the content-data-sets to the display-devices, wherein the method comprises the step of triggering an action if the number of identical and/or similar content-data-sets or representations thereof fulfills a criterion.

8 Claims, 2 Drawing Sheets

(56) References Cited

U.S. PATENT DOCUMENTS

| | | | | |
|---|---|---|---|---|
| 2006/0156160 | A1* | 7/2006 | Haulk | H04L 1/0061 714/746 |
| 2011/0025461 | A1 | 2/2011 | Nobutsugu et al. | |
| 2015/0348450 | A1* | 12/2015 | Park | G09F 3/208 340/5.91 |
| 2015/0378859 | A1* | 12/2015 | Jang | G06F 11/263 714/41 |
| 2018/0137016 | A1* | 5/2018 | Brown | G06F 11/1448 |
| 2020/0364262 | A1* | 11/2020 | Harris | G06F 16/174 |

OTHER PUBLICATIONS

International Search Report issued in PCT/EP2022/060788; mailed May 12, 2022.

A Notice of Facts Regarding Information mailed by the Korean Ministry of Intellectual Property on Aug. 18, 2026, which corresponds to Korean Patent Application No. 10-2024-7038198.

* cited by examiner

METHOD FOR OPERATING AN ELECTRONIC DISPLAY-SYSTEM FOR DISPLAYING PRODUCT AND/OR PRICE INFORMATION

TECHNICAL FIELD

The invention relates to a method for operating a display-system for displaying product and/or price information.

BACKGROUND

Electronic display devices, in particular electronic shelf labels or video shelf rails, are used in display-systems for a variety of tasks at a point of sale and vastly improve the shopping experience. These can be used, for example, to advertise products, to draw customers' attention to a product or to present product and price information in real time. However, the fear that undesired content could be displayed has deterred many business operators from using electronic display devices in the past. Such undesired content can occur, for example, if a user or operator incorrectly operates the display-system or if the display device or the components of the display-system which control the display device are hacked.

Therefore, the object of the invention is to provide a display-system that overcomes the problems discussed above.

SUMMARY OF THE INVENTION

This object is achieved by the method according to claims 1. Therefore, the subject matter of the invention is a method of operating an electronic display-system, wherein the display-system comprises a plurality of electronic display-devices for displaying product and/or price information, wherein each product and/or price information is represented by a content-data-set, and a data provision system that is designed to provide the content-data-sets to the display-devices, and wherein the method comprises the step of triggering an action if the number of identical and/or similar content-data-sets or representations thereof fulfills a criterion.

The measures according to the invention provide the advantage that it can thus be automatically checked by the display-system, to be more precise by the respective entity/entities of the display-system, whether the same or similar content is prepared for display or displayed with an atypically high number of electronic display devices. Such a situation gives rise to the suspicion that incorrect operation or manipulation of the system has taken place. The method therefore allows to automatically detect such situations and to automatically avoid the unobserved displaying of display-content like an image and/or a text and/or a video and/or a multimedia content, which may be created accidentally by a regular operator or on purpose by a hacker. All these incidents may lead to content that should not be displayed at all, because it would otherwise lead to a critical issue in the store and the store may be closed or un-operational for a long period.

Further particularly advantageous embodiments and extensions of the invention arise from the dependent claims and the following description.

In general, the display-system may comprise a smaller or larger number of electronic display-devices. The number of installed display-devices may depend on the size of the store, for example a supermarket, a warehouse or the like, and/or the number of products or product groups offered in the store (or the like).

Such electronic display-devices may be realized as so-called electronic shelf labels (ESL) which are installed on shelf rails at positions along the shelf rail in proximity to the product groups or products with which they are logically linked. They typically comprise a low- or close-to-zero-power consuming display (e.g., realizes by electronic paper or electrophoretic technology) to show product and/or price information for said product groups or products. The content that is shown by the displays is provided by the content-data-set which are sent to the ESLs either by radio signals or wire-based and typically convey text(s) and/or image(s) which are in turn displayed by the display.

Such electronic display-devices may also be realized as so termed video rails, which comprise one or more video screens that are installed on (or along) a shelf rail or form the shelf rail by itself. In contrast to the ESLs the video rails comprise a video display and therefore can display a video with or without embedded virtual electronic shelf labels as the content. The virtual electronic shelf labels or any other text and/or image may be freely positioned along the display of the video rail and may also overlap the video. Again, said content-data-sets are provided to the video rails to convey the video(s) and/or the virtual electronic label(s) or other content, which are in turn displayed by the displays.

Such electronic display-devices may also be realized as smart posters, which allow for a situation specific display of content.

Preferably, the data provision system comprises a content-data-source that generates and/or provides the individual content-data-sets for the individual electronic display-devices. The content-data-source may be realized by a cloud based (software and/or hardware) service or a local server in the premises of the supermarket, wherein in both cases a software is executed on the respective computer architecture which processes human readably text(s) or picture(s) that is content to be displayed by the respective electronic display device. The processing leads to the individual content-data-sets, which are coded in the appropriate data format and which are supplied-typically in an addressed manner—to the individual electronic display devices.

The content-data-sets may also be received by the content-data-source from an external device or source and the content-data-source may only address or in other words distribute the received content-data-sets to the electronic display-devices.

Typically, the data provision system comprises a communication network within the premises of the supermarket, which on the one hand is connected with the content-data-source and on the other hand is connected with the plurality of the electronic display-devices. The communication network is designed to deliver the content-data-sets by radio signals and/or by wires to the respective electronic display-devices. Such a communication network may comprise radio access points, of which each is designed to perform a radio communication with a group of electronic display-devices. Such a communication network may also comprise routers or controllers and the like, to which the electronic display-devices are connected, preferably in groups. Such a controller (sometimes termed rail-controller) may be installed at a shelf-rail and control the display-devices installed at the shelf-rail and realizes a gateway to the communication network outside of the shelf-rail.

The data provision system typically comprises a shop management software that maintains a data base which stores a plan of the entire shop, the shelfs, the products on the shelfs and the electronic shelf labels or video rails linked to the respective product. Such a data structure is commonly known as planogram. Hence the data provision system allows to address each individual electronic display-device to display individual content, which was generated or defined by an authorized user of the display system or in an automated manner. The shop management software may be executed by the content-data-source or by another computer or cloud-based service.

The data provision system may further comprise one or more computer-based input devices which allow the authorized user of the display system to select or to define the human readably text(s) or picture(s) which is intended to be displayed by one of the electronic display-devices or a group of the electronic display-devices. Such an input device may be for example, a computer terminal, a personal digital assistant, a mobile phone, a tablet computer etc. Theses input devices execute a user interface software on their computer hardware, which is programmed to allow the user to perform the appropriate user interaction for the selection or the definition of the human readably text(s) or picture(s) and to interface with the shop management software. The input devices further comprise the hard- and software needed to supply a representation of the human readably text(s) or picture(s) in digital form, e.g., in an intermediate data format or as the content-data-set to the data provision system.

In general, a data provision system, which is a subsystem of the display-system, may comprise the entire processing and communication equipment of the display-system except of the electronics display-devices. The distribution of the individual content-data-set to the respective display devices is typically achieved by addressing the targeted display device by the data provision system to deliver the content-data-set in an addressed manner via the communication network. The data provision system is designed to generate the addressed content-data-sets, in particular by the content-data-source, or receive all or fractions of the content-data-sets and routes it in an addressed manner towards the addressed electronic display devices by the aid of the communication network.

The addressing may be achieved by an upfront registration of the electronics shelf label, so that the data provisioning system knows the identity of the respective electronic display (for example by a unique identification code) and its reachability in the communication network and can therefore address it (for example with addressing data, which are sent out together with the content-data-sets).

According to the addressing the content-data-set concerned is then transported or conveyed, respectively, in particular from the content-data-source, via the communication network of the data provision system to the electronic display-device indicated by the respective address.

The communication network comprises a number of network nodes at which also an addressing takes place so that the conveyed content-data-sets are propagated within the display-system to the next communication network entity or the final destination, which is the addressed electronic display-device. The mentioned communication network nodes may for example be the routers or the access points mentioned or even the rail-controller at the shelf-rail.

In the context of this patent application the term "addressing" may have two different meanings.

Firstly, it may have a static meaning, which means preparation for addressed communication at any entity within the data provision system, which may be the content data source or any node in the communication network.

Secondly, it may have a dynamic meaning, which means transmission in an addressed manner trough the data provision system, in particular through the communication network.

The question if content-data-sets are identical or similar can be answered by directly analyzing the original of the respective content-data-sets. Analyzing the two or more originals of the individual content-data-sets can be done on the file level, for example bit by bit/byte by byte/word by word/and so on. Also, structural elements identified by, for example, pattern recognition or the like in the images may be used to identify identity or similarities between different images. However, directly analyzing the originals may cause a significant payload to the computing power of the component of the display-system involved in the analyzing process.

Therefore it may be more efficient to utilize only a reduced data set (a so termed representation) of the content-data-set for the analyzes. The representation may be only a fraction of the original content-data-set. For example, in case of an image the reduced data-set may cluster pixels by color or gray scale values or the like, which are than compared between different reduced data sets to clarify if the underlaying images can be judged as identical or similar.

In particular the representation of the content-data-set is a hash-value. The hash-value is computed from a data-set (which represents for example a text and/or an image) by the aid of a hash function or hash algorithm. Examples of hash-functions used in security applications are provided for example in ISO/IEC 10118-3:2018 and may be applied in this context. In case of images so termed image hashing is provided, which is a process of using an algorithm to assign a unique hash-value to an image. Duplicate copies of the image (identical images) all have the exact same hash-value. For this reason, in digital image processing the process of computing the hash value is sometimes referred to as a 'digital fingerprint'. Such hash functions may be applied in particular to check if images or strings (in general multimedia data) are identical.

In order to check for similar content-data-sets it is of advantage that the hash value is created by perceptual hashing. As an example of an implementation of such an algorithm "pHash" can be mentioned, which is an open-source perceptual hash library (see http://www.phash.org, which teaches "A perceptual hash is a fingerprint of a multimedia file derived from various features from its content. Unlike cryptographic hash functions which rely on the avalanche effect of small changes in input leading to drastic changes in the output, perceptual hashes are "close" to one another if the features are similar."). This means that in perceptual hashing a mathematical algorithm analyzes an image's content and represents it using a fingerprint (a numerical value). Two images' hash values are "close" to one another if the images' content features are similar. By comparing two image fingerprints (the hash values of similar images), similar images can be identified, for example by the "deviation" of the hash values, which is in particular termed the "hamming distance". In general, the hamming distance is a number of symbols that are different in two data blocks of identical length.

Given the already explained structure of the display-system with its content-data-source and communication network with network nodes the assessment if content-data-sets are identical or similar may take place directly at the content-data-source or at any communication network nodes within the communication network. Hence, each of these elements can be designed, in particular programmed, if a software-based solution is implemented, to perform the assessment, in particular before the content-date-sets involved in the assessment are routed further downstream in the display-system to the next entity of the display-system. As an advantage, identifying identical or similar content-data-sets can be performed already before the content-data-sets are available at the addressed display-devices, in fact before the display-devices display the represented product and/or price information conveyed by the individual content-data-set.

According to another embodiment, the judgment as to whether content data sets are identical or similar may also be made after a camera captures a scene where multiple display devices are present. Such a camera may for example be installed on the ceiling of a shop or directly at a shelf. The capture range of the camera is set such that the displayed content shown by the display screens of the display-devices can be seen by the camera. The camera generates scene-data that represent the captured scene. The scene-data may be analyzed directly in the camera if the processing power of the camera computer allows this. If the processing power of the camera computer is too limited to perform this task in an efficient manner or other circumstances dominate, the scene-data may also be analyzed at any other entity within the display-system after having received the scene-data from the camera. Analyzing the scene-data leads to an indirect judgment of the individual content-data-sets (regarding the question if the content data sets are identical or similar) which were used to convey the product and/or price information to the respective display-devices that are present in the captured scene. The analyzing is focused on the content shown by the individual display screens and performed by, for example, pattern recognition or the like.

The criterion may consist, for example, in the fact that a certain threshold value is reached, exceeded or fallen below. Such a threshold value might be a static threshold (user/operator defined or automatically computed), a functional threshold (for example temporal dependency or a special dependency).

For example, it can be understood as meeting a fixed threshold value criterion if a certain percentage (for example more than 5%, 10%, 20%, 40% or 60% and the like of the entire content-data-sets) of the display devices already display the same or similar content. The same quantitative criterion can be assessed by each of the entities of the data provision system while the content-data-sets propagate through the data provision system, which means while the content-data-sets are transmitted in the addressed manner towards the electronics display-devices and the display devices concerned still display an earlier received product and/or price information or a generic information. Also, at the content-data-source such an assessment may take place during the preparation of the content-data-sets and/or the specifying a designation address for the transfer before the content-data-sets are sent out at all.

However, a weighting can also be considered in the definition of the criterion. In addition to the frequency of the appearance of similar content, a weighting of their similarity can also be used to define the criterion.

The temporal dependence of the criterion may, for example, be given by the time of the day. This dependency can cope with the situation that during closure hours of the shop the electronic display devices may display identical or similar service information, which during normal opening hours would typically not be shown. Also, during inventory processes the number of identical or similar content-data-sets may depend on the grade of completion of the inventory process, thus change in time. Hence over time the criterion may be adjusted to higher numbers of identical or similar content-data-sets before an action is triggered. This means that in dependency of the time a different criterion may be applied, which leads to several criteria that are used within the shop, each at a particular time or period.

There might also be a location-depended-aspect (or geographical-aspect) in the definition of the criterion, which may lead to the spatial dependency of the criterion. For example, the action might be triggered earlier if the same or similar content is displayed nearby each other than when it is displayed at places far from each other. However, it might also be beneficial that the action is triggered earlier if the same or similar content is displayed at places far from each other than when it is displayed nearby each other. The location-dependent-aspect may also be defined by the absolute position or area within the shop. This allows to use, for example, the expression "Ice Cold" for all content-data-sets that are intended to be used for deep frozen products or "biological" for all content-data-sets that are intended to be used for biological groceries. This means that in dependency of the location a different criterion may be applied, which leads to several criteria that are used within the shop, each at a particular location or zone. For this purpose, location-data might be provided. The location-data might for example contain an identification of an electronic display device or an access point (or another network node) connected with the electronic display device or a camera capturing the electronic display device. Such location-data may also be extracted from the planogram of the shop or from a floorplan of the shop, which is available at a central data processing device (for example the content-data-source or the cloud-based service).

The criterion can also be defined by an artificial intelligence. Such an artificial intelligence is trained on a computer with the usual content, i.e., the usual product and/or price information that is to be displayed by the display devices. From this, the artificial intelligence can derive what type and amount of similar or even the same content can be judged as normal in a business premises corresponding to the area of application. For example, the artificial intelligence used for a grocery store can be trained with different data than when used for a shoe store and thus accept a different level of similarity as normal content. In this case, the artificial intelligence defines the criterion in such a manner that the type and amount of similar or identical content significantly exceeds the type and amount of similar or identical content in comparable situations.

In summary it is emphasized that the various aspects of the criterion may be used exclusively or in any combination.

In all cases, the criterion comprises, in addition to potential other aspects as elaborated above, an evaluation of the frequency or the number, respectively, of the occurrence of similar and/or identical content.

As an example, the checking for the fulfillment of the criterion comprises the comparison of each content-data-set or the representation of the content-data-set, for example each hash, with all the other content-data-sets or representations (the hashes) of the other content-data-sets and the determination of the number of same or similar representations. Double counting may be avoided.

Once it has been found that the criterion is fulfilled, it has proven to be advantageous that the action includes at least one of the following:

to send an information about the fulfillment of the criterion to an entity within the display system: This gives the entity within the display system, in particular the content-data-source, and/or an authorized user (e.g., an operator) of the data provision system feedback about the fact of detection of a fulfillment of the criterion and allows the content-data-source to automatically adjust erroneous or critical content or allows the operator to manually adjust such a content.

to send an information about the fulfillment of the criterion to a communication device: Such a communication device might for example be a computer located in the supermarket back-office or a mobile phone of an employee who is responsible for the operation of the display-system. The information about the fulfillment of the criterion can thus be automatically transmitted to the communication device that can process this information, which enables the person responsible to take appropriate actions. The communication device can be a device that is independent of the data provision system, or it can be a component of the data provision system. In particular, the communication device can also be the input device of the data provision system.

trigger an optical or acoustic alarm: On the one hand, this helps to deter the manipulator (hacker) in the event of a manipulation attempt which is performed on site. On the other hand, it gives the sales staff or even the onsite operator an indication that a fulfilment of the criterion has occurred. The alarm can be visualized on the communication device or the input device respectively. The alarm can be emitted from a central point in the supermarket. The alarm can also be emitted from the concerned electronic display devices (for example, by a sound actuator), which allows rapid localization of the electronic display devices concerned.

to document the fulfillment of the criterion: Thus, the fulfillment of the criterion can be set in the temporal or spatial context, which in turn enables further improvement on system safety and reliability of the operation of the system.

to influence the content displayed by at least one of the display-devices: Thus, for example, instead of potentially unwanted content, a harmless content like a blank screen or a predefined message or a company logo can be displayed on the display screen. This might be executed on the display-devices concerned and/or any other display-device, which in turn will give a visual indicator of a major issue to everyone involved in the operation of the display-system at any place within the shop.

to stop providing content-data-sets to the display devices, in particular to stop providing content-data-sets to the addressed display devices: This means that after the fulfillment of the criterion a further preparation and/or distribution of the content which led to the fulfilment of the criterion is prevented. This means that the new content-data-sets that represent potentially undesired content can no longer be used within the display-system. When the content is checked for the fulfilment of the criterion before it is transmitted to the electronic display-devices, potential harm or confusion can be prevented before it occurs. Otherwise, the harm or confusion caused can be limited to only display-devices already showing the content represented by the content-data-sets which caused the fulfilment of the criterion.

to control the display-devices for which the fulfillment of the criterion was determined. Here, "for which the fulfillment of the criterion was determined" shall mean that the content-data-sets which were involved in the fulfillment of the criterion are intended for particular electronic display-devices, for example because they are addressed to these electronic display-devices. This provides a clear identification (unambiguous identification) of the electronic display devices for which the control is to be performed. Hence the electronic display-devices are linked to the content-data-sets that where involved in the fulfillment of the criterion.

To implement the control of the electronic display devices, for example, the data provision system, in particular the access point and/or the content-data-source, is designed to transmit control-data or control-instructions to the display-devices for which the fulfillment of the criterion was determined. For example, the control data might instruct the electronic display-devices to clear the screen.

It is particularly advantageous here that the control of the display devices for which the fulfillment of the criterion has been determined comprises a rollback to an older content-data-set than the content-data-set or the representation thereof included in the determination of the fulfillment of the criterion.

Such an older content-data-set is therefore a trusted content-data-set, in other words a content-data-set that did not contribute to the fulfillment of the criterion in the past. To perform the rollback, the trusted older content-data-set might again be sent to the display device instead of the new content-data-set that contributed to the fulfillment of the criterion. However, it has been proven to be advantageously that a trusted content-data-set is already stored in the electronic display-device and the rollback is performed by instructing the electronic display-device to display that already stored trusted content-data-set on its display screen instead of the new content-data-set that is involved in the fulfillment of the criterion.

According to a further aspect, the method comprises a tracking of every content-data-set or representation thereof sent or intended for sending to an electronic display device and index it to determine the number of usage of identical or similar content-data-sets or representations thereof.

Based on the tracking an index is created. The index list for all content-data-sets (or representations thereof, for example the hash thereof) and the display-device(s) to which the respective content-data-set was sent or is intended for sending.

In fact, the index can be seen as a table in which a particular index row is associated with a particular content-data-set (or its hash value). The particular index row lists only one single electronic display device if no identical or similar content-data-set was assigned to any other electronic display-device. If, in contrast thereto, a particular display-content or similar display-content is used for at least two different electronic display-devices, the index row for such a display-content lists the at least two display devices.

The display-devices are listed, for example, by their unique identification number or any other identifier used in the display system to identify or to address the individual electronic display-devices.

Using the index, it can thus be easily verified (by counting) for each index row for how many electronic display devices the same content-data-set is provided or similar content-data-sets are provided. Therefore, according to a preferred embodiment, the tracking and indexing forms the basis for determining the number of identical or similar content-data-sets that are used or to be used within the display-system.

The fulfillment of the criterion can than easily be checked by browsing through the index and counting the electronic display devices listed per index row. The index itself can be represented by a data structure stored at the desired entity within the display-system where the creation or evaluation of the index takes place or where the index is assessed to check if the criterion is fulfilled.

According to a preferred embodiment, the content-data-set represent an image as the product and/or price information. Hence the method according to the invention is applied on images which are used in the display-system. As images are typically data-intense data structures it is of advantage to use hashes of the images to perform the method of the invention. This reduces the overall data processing workload and storage memory requirements in the display, because the use of hashes reduces the amount of data of the image down to a relatively compact string of symbols which can easily be used to check for identity or similarity between the individual images. Hence, the checking if there are identical or similar images used in the display system can be easily performed at each entity of the display-system even with very limited computing power.

Regarding the use of the image or any other form of a visually perceivable information-conveying element (text, video) in the display-system it is to mention that the content-data-set may also represent only a fraction of the entire display capability (display surface area) of the display of the electronic display device. Such fraction may be used to update only the display section/area concerned by it. Therefore, the method according to the invention can also check if here are too many identical or similar image fractions used in the system which by their size and/or content may give rise to any concerns.

Finally, it is to mention that electronic equipment, like the content-data-source, the entities of the communication network, and the electronic display devices and other devices mentioned in the description of this patent application may be realized by the aid of well-known discreet and/or integrated electronics. Provided that interfaces are required the person skilled in the art will be able to select and design the appropriate interface-circuitry (radio transceivers or digital input and/or output circuitry) to enable data and/or signal communication. Programmable devices may comprise a microprocessor and some peripheral electronics. Such programmable devices may also be realized by the aid of a microcontroller or an application specific intergraded circuit (ASIC) and the like. Execution of software routines on such devices provide computer implemented functions that are discussed herein.

These and other aspects of the invention are obtained from the figures discussed below.

BRIEF DESCRIPTION OF THE FIGURES

The invention is explained again hereafter with reference to the attached figure and based on exemplary embodiments, which nevertheless do not limit the scope of the invention. In the different figures the same components are labelled with identical reference numbers. The Figures show in schematic fashion in.

DESCRIPTION OF THE EXEMPLARY EMBODIMENTS

Figure 1:
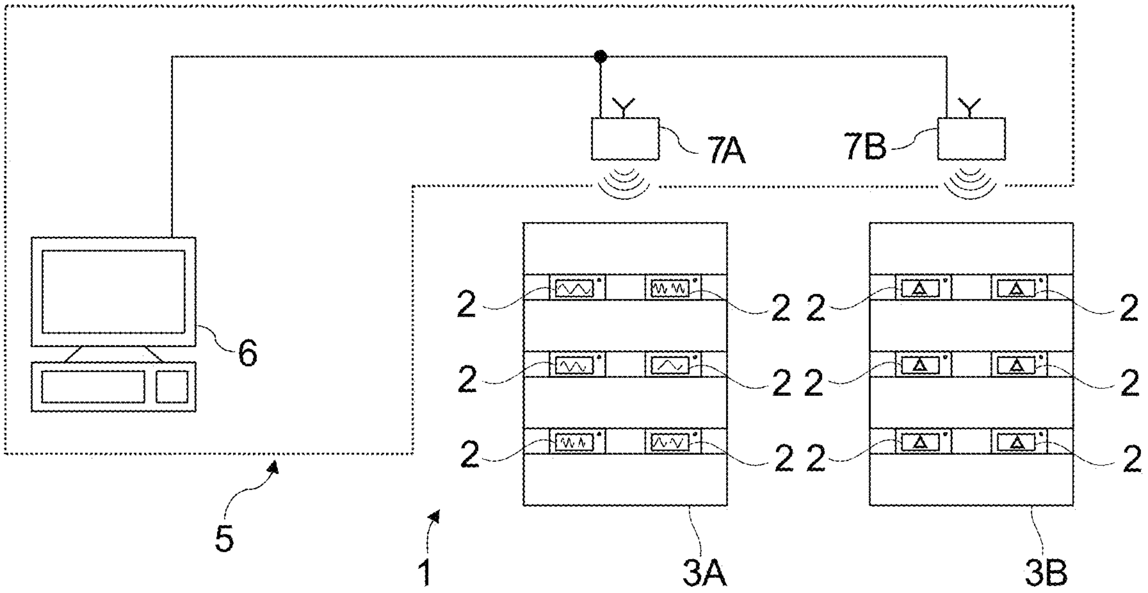
FIG. 1 a first embodiment of a display-system that is used to perform the method according to the invention.

FIG. 1 visualizes a display-system 1 that is installed in a supermarket. There is a first shelf 3A and a second shelf 3B representative for a plurality of shelfs in the supermarket. Each of the shelfs 3A and 3B carries six electronic display devices 2, which in the present embodiment are realized as electronic shelf labels and, in the following, indicated as ESLs 2. Each ESL 2 comprises a data-storage (not shown) to store at least a displayed content-data-set, which represents product and/or price information that is displayed by a screen (shown at the front of the ESL 2) of the respective ESL 2. The ESLs 2 are affixed to shelf rails at positions where products are located on shelf floors (not shown) to display the respective product and/or price information there.

The display-system 1 further comprises a data provision system 5, which forms a subsystem of the display-system 1. The data provision system 5 comprises a content-data-source 6 realized by a computer that also allows a data input by an operator. The content-data-source 6 generates content-data-sets based on an input of the operator or based on a query from an external database in which the product and/or price information for several supermarkets (for example for a supermarket-chain) is stored. The data provision system 5 further comprises a communication network connecting the content-data-source 6 with a first access point 7A and a second access point 7B. The first access point 7A is radio-connected to the ESLs 2 of the first shelf 3A to transmit the display-data-sets to the ESLs 2 of the first shelf 3A. The second access point 7B is radio-connected to the ESLs 2 of the second shelf 3B to transmit the display-data-sets to the ESLs 2 of the second shelf 3B. In summary, in the content provision system 5, the content-data-source 6 provides an individual content-data-set for an ESL 2 that might be transmitted via the communication network via the respective access point 3A or 3B to the ESL 2 in question. As mentioned in the general description, content-data-sets might be provided that convey undesired information or content, respectively. The following examples demonstrate how to deal with the occurrence of this type of content-data-sets.

Example I

In a first example, shown in FIG. 1, it is assumed that new content-data-sets have been transmitted to the ESLs 2 to update the content displayed by the ESLs 2. In each ESL 2 the new content-data-set is stored in the data-storage (digital memory unit) together with a previously received content-data-set, which is termed a trusted content-data-set. The ESLs 2 of the first shelf 3A display the correct product and price information. However, the ESLs 2 of the second shelf 3B display a triangle instead of the product and price information. Each of the ESL 2 generates a hash value, sometimes only termed "hash", of the displayed content using a perceptual hashing algorithm. Since all the ESLs 2 of the second shelf 3B display the same (undesired) content, all the hashes of the ESLs 2 of the second shelf 3B are the same. The generated hashes are transmitted via the radio-connection to one of the access points 7A or 7B and further via the communication network to the content-data-source 6. The content-data-source 6 counts the appearance (number) of same (and similar) hashes and recognizes, that a discrepancy in the distribution of the content-data-sets has occurred, since a criterion for the triggering of an action has been fulfilled. In this case the criterion is the occurrence of more than three same hashes.

Since the criterion is fulfilled, actions are triggered. The actions in this exemplary embodiment include, that an information about the fulfillment of the criterion is sent to an external communication device, particularly to a mobile phone of the operator (not shown) via an internet connection and that control-data are sent to the affected ESLs 2 of the second shelf 3B. The control-data instruct the ESLs 2 to perform a rollback to display the product and/or price information represented by the trusted content-data-set stored in the data-storage of the respective ESLs 2 of the second shelf 3B. As a result the ESLs 2 of the second shelf 3B will show valid product and/or price information instead of the triangles.

Example II

Again, referring to FIG. 1, a second example of the method of operating the display-system is explained. In this example it is assumed that all of the ESLs 2 display content which is represented by trusted content-data-sets already received by the ESLs 2. New content-data-sets have been created by the content-data-source 6 and have been released by the content-data-source 6 to the access points 7A and 7B to update the ESLs 2.

In this example the access points 7A and 7B check the content-data-sets received from the content-data-source 6, wherein each of the content-data-sets is intended to be further routed to the respective ESL 2. Here, the access points 7A and 7B generate the hash for each content-data-set received using the perceptual hashing algorithm and each of the access points 7A and 7B counts the number of identical and/or similar hashes and triggers actions if the criterion is fulfilled. For the sake of simplicity, again the criterion for each access point 7A and 7B is the appearance of more than three identical or similar hashes.

The actions in this exemplary embodiment include, that an information about the fulfillment of the criterion is sent to an external communication device, particularly to a mobile phone of the operator (not shown) via an internet connection and that the transmissions of the content-data-sets involved in the fulfillment of the criterion is stopped or prohibited at the access point 7B. In contrast to the situation shown in FIG. 1 the display of the triangles on the ESLs 2 of the second shelf 7B can be prevented before it takes place.

Example III

According to a third example, the content-data-source 6 itself can check the content for the fulfilment of the criterion even before it is transmitted to the access points 7A and 7B and trigger the desired action(s) if the criterion is fulfilled. In this example, at least one of the actions may be the avoidance of any release of new content-data-sets at all. As a consequence the propagation of undesired content within the communication network is completely avoided. Again, in contrast to the situation shown in FIG. 1 the display of the triangles on the ESLs 2 of the second shelf 7B can be prevented before it takes place.

Example IV

Figure 2:
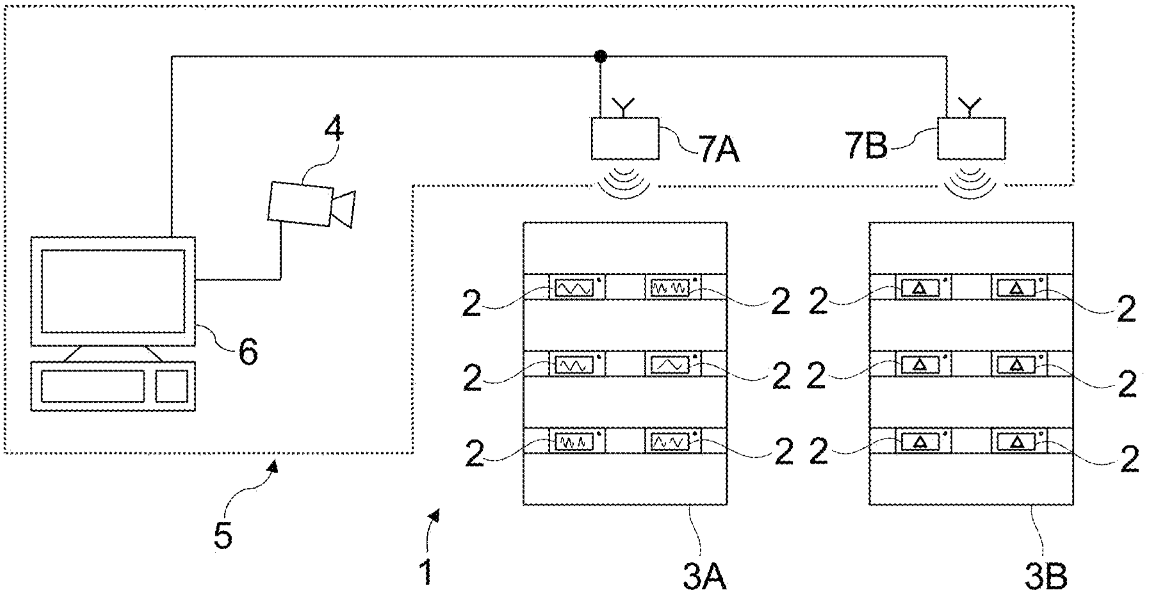
FIG. 2 another embodiment of the display-system.

As shown in FIG. 2, the display-system 2 according to a second embodiment comprises a camera 4. The camera 4 comprises an internal computer to perform image processing of the captured images and/or videos. The camera 4 captures both shelfs 3A and 3B and generates scene-data that represent the captured scene, in which the content displayed by the individual ESLs 2 is visible. Since the shape of the ESLs 2 are known to the computer of the camera 4, the content displayed by the ESLs 2 can easily be found and interpretated in the scene-data by the aid of pattern recognition. The computer of the camera 4 therefore generates an actually displayed content-data-set for each of the captured content displayed by the ESLs 2 from the scene-data. The computer of the camera 4 compares the new generated content-data-sets for similarities or even identity. If the criterion (more than three same or similar content-data-sets or hashes thereof) is fulfilled, the actions are trigged as described. In particular, here the camera 4 triggers the content-data-source 6 to transmit the control-signal to initiate the rollback at the ESLs 2 of the second shelf 7B. For this purpose, the camera is connected with the content-data-source 6 and via the content-data-source 6 with the access points 7A and 7B and therefor with the ESLs 2. In contrast to the other described embodiments, this embodiment allows to directly check the actually displayed content and not only to check the content-data-sets used to transport the content to the respective ESLs 2.

Figure 3:
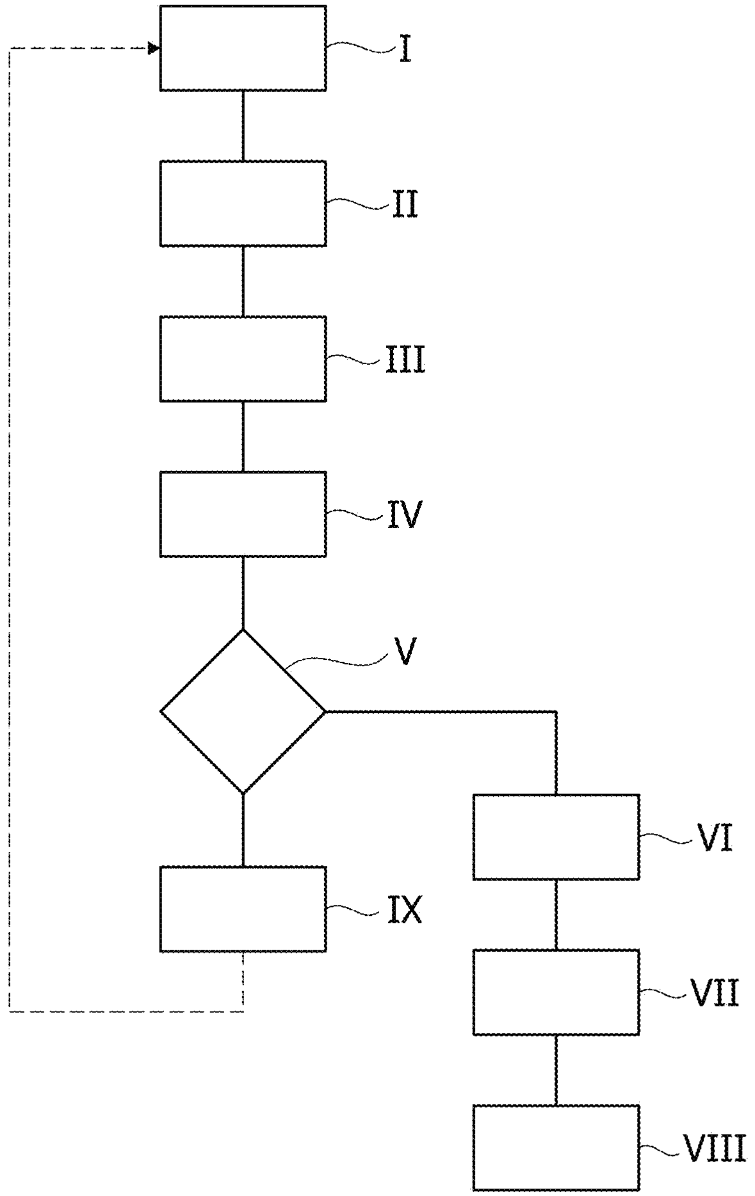
FIG. 3 a flow chart that visualizes the method according to the invention.

In the following reference is made to FIG. 3 which shows in a flow chart an embodiment of the method according to the invention. The respective steps of the method are carried out automatically by the display system 1.

The method starts in a block I where content-data-sets are provided that are used within the display-system to display product and/or price information by the individual electronic display devices (ESLs 2).

In a block II a hash value is computed for each of the data-sets used.

In a block III—based of the hash values—it is determined if there exist any identical or similar content-data-sets that are indented for use or already in used at the electronic display-devices (ESLs 2).

In a block IV the number of identical or similar content-data-sets is determined.

In a block V it is checked if the determined number fulfills a criterion.

If at the block V it is determined that the criterion is fulfilled the method branches to a block VI where a rollback to earlier used (trusted) content-data-sets is performed to avoid the use of the content-data-sets, for which the fulfilment of the criterion was determined.

The method continues thereafter at block VII where the trusted content-data-sets are used to which the rollback was performed.

Thereafter the method ends in a block VIII in which an operator or control instance of the display-system is informed about the occurrence of the fulfillment of the criterion.

If at the block V it is determined that the criterion is not fulfilled the method branches to a block IX where the content-data-sets are used for which it was determined that the criterion was not fulfilled. Thereafter the method ends at block IX until it is re-started at the block I or, optionally, the method continues at block I, which is indicated by an arrow shown with broken lines and pointing to the block I.

Summarized in other words, the present invention provides a display-system that is designed for detecting a global store displays anomaly and auto recovery. When a client (or a harmful person) with an access to the display-system solution (legal or illegal), send the same image or very similar to all or part of the ESLs in the store:

the image can be a "normal" image, a harmful image, a blank image (full white, full black, etc.)

the image sending can result from a "hack" or from a legal (normal) call through standard API (application programming interface).

the image sending can be due to an error or by harmful intentions the image is displayed on x % of the store or the full store.

This can lead to a critical issue in the store and the store may be closed or un-operational for a long period.

A solution to this problem is:

to track every image sent to the ESL and index it, to verify for every image sent what is the number of ESLs receiving the same image (or a hash of the image), or similar image.

if the image (or it's hash) has been used on high percentage of the ESLs: stop the process of sending images to the ESLs, rollback the suspected ESLS to an older "trusted" image that was already on the ESL, alert the cloud services about the problem.

Finally, let it be noted once again that the figures described in detail above only involve exemplary embodiments, which the expert can modify in a wide variety of ways without departing from the area of the invention. For the sake of completeness, let it also be stated that use of the indeterminate article "a" or "an" does not mean that the respective features cannot be present multiple times.

The invention claimed is:

1. A method of operating an electronic display-system, wherein the display-system comprises:

a plurality of electronic display-devices for displaying product and/or price information, wherein each product and/or price information is represented by a content-data-set, a data provision system that is designed to provide the content-data-sets to the display-devices, wherein the method comprises:

determining hash-values for each of the content-data-sets from the data provision system;

determining the number of identical and/or similar hash-values among the determined hash-values; and triggering an action if the number of identical and/or similar hash-values fulfills a criterion.

2. The method according to claim 1, wherein the hash-values are created by perceptual hashing.

3. The method according to claim 1, wherein the action includes at least one of the following:

to send an information about the fulfillment of the criterion to an entity within the display system, to send an information about the fulfillment of the criterion to a communication device, trigger an optical or acoustic alarm, to document the fulfillment of the criterion, to influence the content displayed by at least one of the display-devices, to stop providing content-data-sets to the display-devices, to control the display-devices for which the fulfillment of the criterion was determined.

4. The method according to claim 3, wherein the action includes the control of the display-devices for which the fulfillment of the criterion has been determined, which comprises a rollback to an older content-data-set than the content-data-set or the representation thereof included in the determination of the fulfillment of the criterion.

5. The method according to claim 1, wherein the method comprises a tracking of every hash-value sent or intended for sending to at least one of the display-devices and index it to determine the number of usage of identical or similar hash-values.

6. The method according to claim 1, wherein the content-data-set represent an image as the product and/or price information.

7. The method according to claim 1, wherein the action includes at least one of the following:

to stop providing content-data-sets to the display-devices, to cause the electronic display-devices for which the fulfillment of the criterion was determined to display a blank screen or a predefined message or a company logo, to cause the display-devices for which the fulfillment of the criterion was determined to rollback to an older content-data-set than the content-data-set or the representation thereof included in the determination of the fulfillment of the criterion.

8. The method according to claim 7, further comprising:

causing the display-devices to display the product and/or price information represented by the content-data-set from the data provision system when the criterion is not fulfilled.

* * * * *